(12) United States Patent
Ebertseder (10) Patent No.: US 11,526,171 B2
(45) Date of Patent: Dec. 13, 2022

(54) METHOD FOR OPERATING A SYSTEM MADE UP OF AN AGRICULTURAL WORKING VEHICLE AND AT LEAST ONE WORKING TOOL ARRANGED THEREON

(71) Applicant: ZF Friedrichshafen AG, Friedrichshafen (DE)

(72) Inventor: Thomas Ebertseder, Pocking (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 295 days.

(21) Appl. No.: 16/764,402

(22) PCT Filed: Oct. 17, 2018

(86) PCT No.: PCT/EP2018/078349
§ 371 (c)(1),
(2) Date: May 15, 2020

(87) PCT Pub. No.: WO2019/096525
PCT Pub. Date: May 23, 2019

(65) Prior Publication Data
US 2020/0272153 A1  Aug. 27, 2020

(30) Foreign Application Priority Data

Nov. 17, 2017 (DE) ...................... 10 2017 220 539.3

(51) Int. Cl.
*A01B 76/00* (2006.01)
*G05D 1/02* (2020.01)
(Continued)

(52) U.S. Cl.
CPC .......... *G05D 1/0212* (2013.01); *A01B 76/00* (2013.01); *A01B 79/00* (2013.01); *A01C 21/00* (2013.01);
(Continued)

(58) Field of Classification Search
CPC .............. G05D 1/0212; G05D 1/0094; G05D 2201/0201; A01B 76/00; A01B 79/00;
(Continued)

(56) References Cited

U.S. PATENT DOCUMENTS

| 9,719,973 B2 | 8/2017 | Pickett et al. |
| 2009/0192654 A1 | 7/2009 | Wendte et al. |

(Continued)

FOREIGN PATENT DOCUMENTS

| BR | 112020007562 A2 | 9/2020 |
| BR | 112020007340 A2 | 10/2020 |

(Continued)

*Primary Examiner* — Frederick M Brushaber
(74) *Attorney, Agent, or Firm* — Leydig, Voit & Mayer, Ltd.

(57) ABSTRACT

A method is provided for operating a system consisting of an agricultural working vehicle, at least one working tool arranged thereon, and a controller assigned to the working vehicle. The method includes detecting, by at least one sensor assembly arranged at least on the working tool and having at least two sensors, two different physical variables. The method further includes storing, by a memory, information characterizing the working tool, continuously storing, by the memory, operating data of at least the working tool, and communicating wirelessly via Bluetooth network with the controller by the at least one sensor assembly via a transmitter. The controller is brought into a transmission range of the sensor assembly to activate the communication between them and the operating data temporarily stored in the memory is transmitted to the controller.

16 Claims, 4 Drawing Sheets

(51) Int. Cl.
    *A01B 79/00*     (2006.01)
    *A01C 21/00*     (2006.01)
    *A01M 7/00*     (2006.01)
    *G05D 1/00*     (2006.01)

(52) U.S. Cl.
    CPC ......... *A01M 7/0089* (2013.01); *G05D 1/0094*
    (2013.01); *G05D 2201/0201* (2013.01)

(58) Field of Classification Search
    CPC ..... A01B 69/007; A01B 79/005; A01C 21/00; A01M 7/0089
    See application file for complete search history.

(56) References Cited

U.S. PATENT DOCUMENTS

| | | | |
|---|---|---|---|
| 2016/0185291 A1* | 6/2016 | Chamberlin | B60Q 9/00 |
| | | | 701/70 |
| 2016/0202227 A1* | 7/2016 | Mathur | G06F 30/00 |
| | | | 702/2 |
| 2018/0116102 A1* | 5/2018 | Taylor | A01B 69/004 |
| 2020/0246344 A1 | 8/2020 | Lisanti et al. | |
| 2020/0260685 A1 | 8/2020 | Slade | |
| 2020/0267926 A1 | 8/2020 | Andersson | |
| 2020/0272153 A1* | 8/2020 | Ebertseder | A01B 79/005 |
| 2020/0275632 A1 | 9/2020 | Andersson | |
| 2020/0297703 A1 | 9/2020 | Nirogi et al. | |
| 2020/0308324 A1 | 10/2020 | Oderkerk et al. | |
| 2020/0338871 A1 | 10/2020 | Dietrich et al. | |
| 2020/0344949 A1 | 11/2020 | Kalverkamp et al. | |
| 2021/0190754 A1 | 6/2021 | Stoller et al. | |
| 2021/0361627 A1 | 11/2021 | Roberts et al. | |

FOREIGN PATENT DOCUMENTS

| | | | | |
|---|---|---|---|---|
| BR | 112020007356 A2 | 10/2020 | | |
| BR | 112020007730 A2 | 10/2020 | | |
| BR | 112020007940 A2 | 10/2020 | | |
| BR | 112020007985 A2 | 10/2020 | | |
| BR | 112020007993 A2 | 10/2020 | | |
| BR | 112020007995 A2 | 10/2020 | | |
| BR | 112020008008 A2 | 10/2020 | | |
| BR | 112020008022 A2 | 10/2020 | | |
| BR | 112020008046 A2 | 10/2020 | | |
| BR | 112020008050 A2 | 11/2020 | | |
| DE | 19804740 A1 | 8/1999 | | |
| DE | 10335112 A1 | 2/2005 | | |
| DE | 102007034167 A1 | 1/2009 | | |
| DE | 102015225460 A1 | 7/2016 | | |
| EP | 2132971 A1 | 12/2009 | | |
| EP | 2907385 A1 | 8/2015 | | |
| EP | 3112812 B1 * | 10/2017 | ............. | B60K 35/00 |
| WO | WO 0116661 A1 | 3/2001 | | |

* cited by examiner

METHOD FOR OPERATING A SYSTEM MADE UP OF AN AGRICULTURAL WORKING VEHICLE AND AT LEAST ONE WORKING TOOL ARRANGED THEREON

CROSS REFERENCE TO RELATED APPLICATIONS

This application is a U.S. National Stage Application under 35 U.S.C. § 371 of International Application No. PCT/EP2018/078349 filed on Oct. 17, 2018, and claims benefit to German Patent Application No. DE 10 2017 220 539.3 filed on Nov. 17, 2017. The International Application was published in German on May 23, 2019 as WO 2019/096525 A1 under PCT Article 21(2).

FIELD

The invention relates to a method for operating a system consisting of an agricultural working vehicle and at least one working tool arranged thereon, and to a system comprising an agricultural working vehicle and at least one working tool arranged thereon.

The invention also relates to a control unit for a system comprising an agricultural working vehicle and at least one working tool arranged thereon, and to a computer program product.

BACKGROUND

A system comprising an agricultural working vehicle, in particular a tractor, and a working tool arranged thereon generally forms the basis for working an agriculturally used field. By means of the working vehicle, the working tool is moved over the field and driven by means of a power take-off in order to carry out working steps, such as soil cultivation, sowing, planting, harvesting, fertilizing or spraying. In this case, the working tool is often operated to follow rows during field driving, resulting in predetermined lateral distances between the rows which are to be maintained. In addition, defined distances are provided within a row between individual plants of the crop and are selected as a function of the crop during its sowing. The lateral distances between adjacent rows and the distances within a respective row, i.e., the plant distance numbers, are selected in such a way that a best possible yield per unit area is ensured for the respective crop. High precision is thus required in the execution of the various working steps. For the efficient and safe operation of the system, it is expedient to take into account the technical requirements and circumstances of the working tool attached thereto. Due to the large number of working tools available on the market, it is often a great challenge for a vehicle driver to obtain knowledge about the relevant information. Acceptance of incorrect information or total lack of information may have adverse effects on the functionality, safety, accuracy or efficiency of the working tool or of the system comprising the working tool and vehicle.

The system comprising the working vehicle and the working tool arranged thereon is operated by an operator, who sets the driving speed during field driving. For this purpose, a control unit which can be configured to set and maintain a constant driving speed is assigned to the working vehicle. The driving speed is set by the operator, who uses the obtained subjective impressions of the respective soil condition of a field to be worked as a basis. In the event that the control unit is not configured to maintain a constant driving speed, the operator must actively control the driving speed.

Systems are known from the prior art, according to which a working tool attached to the working vehicle is recognized by means of a bus system to which the working tool is connected. This results in a direct, wired data transmission between the working tool and the working vehicle. Reference is made in this connection, for example, to DE 198 04 740 A1.

The essential precondition for the functioning of the data transmission is that both the working vehicle and the working tool must have bus systems communicating with one another. Oftentimes, this is not the case, at least in older working vehicles or working tools, and can be realized subsequently with significant expense. In addition, problems often arise with regard to compatibility, which can be attributed to various causes. In particular, different combination standards are used by different manufacturers of the working vehicles or working tools and preclude combination or at least make it error-prone. A further weak point is the necessary physical connection of communication lines between the working vehicle and the working tool, which connection not only represents additional expenditure but may also be failure-prone.

DE 10 2007 034 167 A1 discloses providing a working tool as part of a system comprising an agricultural working vehicle and the working tool with a transponder which can be read and written in the radio frequency range and is part of a radio frequency identification system. In addition, the working tool comprises a job computer which comprises a read/write device for receiving and sending data from/to the transponder. Alternatively, the working vehicle can have its own read/write device operating in the radio frequency range, in order to be able to communicate directly with the transponder on the working tool. For communication with the transponder, the read/write device of the RFID system is integrated into an existing CAN network on the working vehicle or on the working tool. Operating data of the working tool is detected by the job computer or a control unit of the working vehicle and transmitted to the transponder.

EP 2 907 385 A1 discloses a method for operating a system comprising an agricultural working vehicle designed as a tractor and a field sprayer arranged on the working vehicle. The field sprayer has connecting rods which are subjected as a result of inertial forces during cornering to ever higher mechanical loads due to the increasing working widths. In order to detect the mechanical loads, an acceleration sensor is arranged on the connecting rods and detects the value of a mechanical load when it occurs on the connecting rods and exceeds the damping properties of damping means arranged on the connecting rods. Such value is sent to an output device in the cab of the tractor, in order to signal to an operator of the tractor the occurrence of a high mechanical load on the connecting rods of the field sprayer, which leads to damage to the connecting rods or increased wear of the damping means. By indicating the mechanical load peaks by means of the output device, the operator is to be urged to adapt the driving speed or the driving style.

SUMMARY

In an embodiment, the present invention provides a method for operating a system consisting of an agricultural working vehicle, at least one working tool arranged thereon, and a controller assigned to the working vehicle. The method includes detecting, by at least one sensor assembly arranged at least on the working tool and having at least two sensors, two different physical variables. The method further includes storing, by a memory, information characterizing the working tool, continuously storing, by the memory, operating data of at least the working tool, and communicating wirelessly via Bluetooth network with the controller by the at least one sensor assembly via a transmitter. The controller is brought into a transmission range of the sensor assembly to activate the communication between them and the operating data temporarily stored in the memory is transmitted to the controller.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Starting from the above-described prior art, the present disclosure describes a method for operating a system consisting of an agricultural working vehicle and at least one working tool arranged thereon, and a system comprising an agricultural working vehicle and at least one working tool arranged thereon, in order to simplify and more cost-effectively design the detection and exchange of operating data between the working tool and the working vehicle.

The disclosure describes a method for operating a system consisting of an agricultural working vehicle and at least one working tool arranged thereon, with a control unit assigned to the working vehicle, and at least one sensor unit arranged at least on the working tool. Agricultural working vehicles are, among other things, tractors, trac vehicles, equipment carriers or self-propelled harvesting machines, to which at least one working tool is attached or with which at least one working tool is pulled, wherein a pulled working tool can also be a trailer. A control unit may be detachably arranged on the working vehicle and movable with the same or carried along by the vehicle driver. In the latter case, it may, for example, be a smartphone or a phablet, a PDA, a tablet PC or the like.

The sensor unit comprises at least two sensors, by means of which two different physical variables are detected, a memory unit in which information characterizing the working tool is stored and detected operating data of at least the attachment is continuously stored, and a transmitting unit, by means of which the at least one sensor unit communicates wirelessly with the control unit by means of Bluetooth network. In order to activate the communication between them, the control unit is brought into a transmission range of the sensor unit, and the operating data temporarily stored in the memory unit is thereupon transmitted to the control unit. The wireless communication between the sensor unit and the control unit takes place by means of Bluetooth through the transmitting unit integrated into the sensor unit. The use of the Bluetooth Low Energy (BLE) radio standard is particularly expedient, since this achieves a high operating time of the at least one sensor unit on the working tool. By means of the at least two sensors which detect different physical variables, working tool-specific operating data can be determined in each case and is stored in the memory unit. The operating data stored in the memory unit can be retrieved at any time by means of the control unit.

The method according to the disclosure makes it possible in a simple and cost-effective manner to, even subsequently, equip working tools that do not have a bus system or a separate measuring sensor system, with such a sensor unit in order to detect operating data of the working tool and to enable information exchange between the working tool or the transmission of operating data of the working tool to the control unit assigned to the working vehicle. The vehicle driver of the working vehicle can receive, evaluate and display the stored operating data of the working tool by means of the control unit. The operating data received by the control unit can also be transmitted by means of a radio connection, for example UMTS or WLAN, to a higher-level central planning system. The operating data is also stored in the memory unit over a longer period of time, but at least for the duration until retrieval by the control unit. The transmission of the operating data stored in the memory unit of the sensor unit is carried out automatically if the control unit is brought into the transmission range of the sensor unit.

In order to ensure an unambiguous assignment of the operating data received from the sensor unit, the sensor unit can have an individual identifier, by means of which the sensor unit is identified by the control unit. In this case, the control unit can be operated in such a way that, in a first step, the individual identifier of the sensor unit is matched by means of a database stored in the control unit. On the basis of the matching carried out, the control unit can decide whether the communication with the sensor unit is continued, in order to receive operating data of the working tool on which the sensor unit is arranged. The control unit can preferably assign an individual identifier to the transmitting unit of the sensor unit arranged on the working tool and use it to identify the working tool if the control unit is within the transmission range of the transmitting unit. The identifier can be a dedicated, unique address of the transmitting unit. On the basis of the identifier, specific data about the respective working tool can be retrieved in the control unit. The specific data can include, among other things, the type of working tool, movement profiles or operating duration, along with specifications, such as a maximum drive torque, for operating the identified working tool. A signal can thus be transmitted by the control unit to a transmission control device, which provides a torque permissible for the working tool at the power take-off of the working vehicle.

In particular, at least temperature and humidity can be determined by the sensor unit as physical variables. Corresponding temperature and humidity sensors, which are integrated into the sensor unit and can preferably be designed as a combined temperature and humidity sensor, make it possible to determine the temperature and humidity of material worked, processed, transported or spread by the working tool. The material can, for example, be bulk material, such as crop or seed or a liquid, such as liquid manure, water, ensiling agents or plant protection agents. For example, the moisture content of crop can thus already be determined on a working tool designed as a transport trolley, in order to decide on the basis of the humidity determined by sensors whether the crop must first be supplied to a drying or can be stored directly.

According to a preferred development, the sensor unit can comprise a position signal receiving unit, by means of which the respective location of the working tool is continuously detected independently of its operating state. The respective location of the working tool is determined and recorded independently of whether it is carried and/or operated by the working vehicle, carried by a transport vehicle between different fields and/or operating sites, or is stored or deposited at a location at a farm facility or on a field. On the basis of the position data detected by sensors and stored by the memory unit, information can be derived as to which paths have been covered in front of the working tool, irrespective of whether a control unit was within range of the transmitting unit of the working tool along the way.

A preferred development of the method provides that the sensor unit comprises an acceleration sensor, by means of which an operating state of the working tool is determined. The operating hours of the working tool can thus be determined by a corresponding evaluation of the signals of the at least one acceleration sensor, since the actual operating hours of the working tool often do not correspond to the operating hour counters of the working vehicles because of frequent shifts of the working vehicles. Various operating states, such as storage, transport and operation of the working tool, can be recognized by the at least one motion sensor in the process. The respective duration of the various operating states can be determined by the control unit from the data stored in the memory unit. Maintenance intervals of the working tool can be monitored reliably in this way. The various operating states, such as storage, transport and actual usage of the working tool, can be differentiated by the control unit on the basis of the detected acceleration signals after speaking evaluation.

According to an advantageous development, signals representing a vertical acceleration can be transmitted continuously from the at least one acceleration sensor to the control unit, by means of which the signals of the at least one acceleration sensor are evaluated in order to determine movement amplitudes of the working tool, wherein a maximum driving speed, which ensures that the at least one working tool follows the rows during field driving, is determined as a function of the movement amplitudes.

A working tool which has a plurality of work units which are arranged next to one another and serve to work or treat field soil and a crop located thereon is considered to be a row-following working tool. The distances of the work units relative to one another define individual row distances within which the field soil is worked by the working tool. The quality of working a field or field soil essentially depends on maintaining the row distances along with the plant distance numbers. Deviations in maintaining them can in particular result from movements of the working tool in an essentially vertical direction due to driving speed and soil condition and can influence the quality of the work or the output. In order to counteract this, the movement amplitudes of the working tool can be determined by means of the acceleration values detected by the at least one motion sensor.

In addition, the frequency of the movement amplitudes can also be determined. The occurrence of vibrations on the working tool can thus be detected. If the movement amplitudes exceeded a parameterizable threshold value, a maximum driving speed is determined by the control unit. The maximum driving speed determined by the control unit can be adapted to the soil condition and the resulting movements of the working tool, which can be derived from the movement amplitudes. The parameterizable threshold value specifies the order of magnitude of the movement amplitudes within which the precise working by the working tool is possible. Such threshold values vary depending on the type and mode of operation of the working tool used in each case. Taking into account the soil condition and thus the operating conditions when the respective working tool is used at maximum efficiency, it is thus possible to achieve the best possible precision in working a field.

In contrast, with the method according to EP 2 907 385 A1, only the driving speed and the driving style are taken into account in that the influence on the mechanical loading of the working tool designed as a field sprayer is monitored with regard to its wear and service life, but not the influence on the result of the working of the field or field soil by the working tool.

The driving speed of the working vehicle can preferably be automatically adapted by the control unit to the determined maximum driving speed. The automatic adaptation of the respective driving speed to the soil condition has an approximately linear effect on the frequency of the movements and the movement amplitude of the working tool. The automatic adaptation is advantageous if the control unit itself or an additional control device is provided for adapting the current driving speed of the working vehicle.

Furthermore, the maximum driving speed of the working vehicle determined by the control unit can be visualized on an output device. The output device can, for example, be a display arranged on the working vehicle or part of the control unit. The visualization shows the operator, on the one hand, the effects of the selected driving speed on the operating behavior of the working tool. For this purpose, the values received from the sensor unit can additionally be visualized. On the other hand, the visualization can serve to instruct the operator to manually adapt the current driving speed if a corresponding control device for the automatic cruise control of the working vehicle is not present.

According to a preferred development, position signals received from a positioning system can be sent to the control unit and are assigned by the control unit to the respective signals, which are detected by the at least one acceleration sensor and which represent vertical acceleration. For this purpose, the sensor unit can have an additional sensor which is configured to receive the positioning signals. The positioning signals, like the signals of the acceleration sensor, are stored at least temporarily in the memory unit of the sensor unit, in order to also be able to read them at a later point in time.

The detected movement amplitudes and their frequency can thus be mapped by the control unit by means of the detected position signals. By means of the mapped data, an individual movement profile can be created for the system comprising the working vehicle and the working tool, which has worked the field or the parcel of arable land. Such a movement profile can be retrieved by the system when the same field is worked again, in order to adapt the driving speed in advance. In this case, the movement profile can be updated by detecting the vertical acceleration again during further working of the field.

A preferred development of the method provides that the signals of the at least one acceleration sensor are evaluated by the control unit for operating state recognition. The operating hours of the working tool can thus be determined by a corresponding evaluation of the signals of the at least one acceleration sensor, since the actual operating hours of the working tool often do not correspond to the operating hour counters of the working vehicles because of frequent shifts of the working vehicles. Various operating states, such as storage, transport and operation of the working tool, can be recognized by the at least one motion sensor in the process. The respective duration of the various operating states can be determined by the control unit from the data stored in the memory unit.

An advantageous embodiment of the method provides that at least one operating parameter specific to the working tool is stored in the memory unit and is used by a control device of the working vehicle to operate the working tool. The at least one operating parameter can thus comprise a value for a maximum transmissible torque and/or special hydraulic/control adjustments. Further operating parameters can include the dimensions, such as the working depth, working width, the length, weight or the position of the center of gravity of the working tool. Furthermore, preferred hydraulic channel assignment, valve settings, flow rates, timer values or power take-off shaft speeds, power take-off shaft torques or connection dimensions can be stored as operating parameters. As a result, the vehicle driver is assisted and relieved when connecting the working tool to the working vehicle and starting it up.

In this case, it can be provided that the at least one specific operating parameter is transmitted from the control unit or the at least one sensor unit to the control device of the working vehicle. In other words, the communication for transmitting the at least one operating parameter specific to the working tool can take place indirectly via the control unit or directly through data exchange between the sensor unit and the control device of the working vehicle.

The determination of the acceleration amplitudes by the control unit can be used to control the transmission control device. Such a combination can advantageously be used on working tools which are used to spread fluids. This can, for example, be a field sprayer or a liquid manure barrel with a precision manifold, which is arranged on and driven by the working vehicle. During field driving, the continuous change of the fill level in the fluid container of the fluid-spreading working tool leads, with increasing emptying, to a change in the movement amplitudes due to the vertical acceleration when driving over uneven ground. This can be used to infer a change in the fill level of the fluid container. Since a working vehicle which carries a working tool with a fuller fluid container requires different transmission settings than a working tool with an empty fluid container, the transmission control device can be controlled accordingly. In addition, a fill-level sensor can be provided, which transmits fill level signals to the control unit, which makes it possible to control the transmission control device more precisely.

Fill-level data of a fluid-spreading working tool provided by the sensor unit by means of a fill-level sensor system can preferably be received and stored. In this way, data determined by the fill-level sensor system with regard to the loading state of the fluid-spreading working tool can be notified to the vehicle driver, if the vehicle driver is located with his control unit within the transmission range of the sensor unit. In particular when spreading liquids, it is important for the vehicle driver to know the loading state of the working tool or of the working tool designed as a trailer, in order to be able to plan ahead. The knowledge of the fill-level data relevant to a quantity calculation if the working tools comprise borrowed or leased working tools is also important. The same applies to the number of fillings of a tank of the working tool.

According to an advantageous development, fill-level data of a fluid-spreading working tool can be determined and stored by the sensor unit by means of a humidity sensor. In this development, the sensor unit can function as a fill-level sensor. In the simplest case, an arrangement of a sensor unit in a container for a liquid is provided at a position which corresponds to a minimum fill level in the container which must be exceeded when the container is refilled. Naturally, a plurality of sensor units can also be provided, in order to be able to determine various fill levels.

It can furthermore be provided that the fill-level data received from the sensor unit are used by the control unit to control a transmission control device of the working vehicle. By evaluating the fill-level data transmitted from the sensor unit to the control unit, it is possible to infer the respective current weight of the working vehicle and of the working tool arranged thereon, such as a tank truck or liquid manure barrel, in order to adapt transmission settings of the working vehicle by control by the transmission control device as a function of the determined weight. This is particularly advantageous if the working tool is a pulled liquid manure barrel, the fill level of which changes continuously, and an adaptation of the transmission setting is therefore recurrently required. This adaptation of the transmission setting can also be controlled automatically based on the continuously performed monitoring of the fill level by the sensor unit.

The disclosure further describes a system comprising an agricultural working vehicle and at least one working tool arranged thereon is proposed. The system comprises a control unit assigned to the working vehicle along with at least one sensor unit arranged on the working tool. The sensor unit comprises at least two sensors for detecting two physical variables, a memory unit for continuously storing operating data of at least the attachment, along with a transmitting unit for wireless communication with the control unit. For the automatic activation of the communication between the sensor unit and the control unit, the control unit must be brought into a transmission range of the sensor unit, in order to transmit operating data temporarily stored in the memory unit to the control unit in an automated manner.

In particular, the system consisting of an agricultural working vehicle and at least one working tool arranged thereon can be operable to follow rows during field driving, wherein a sensor of the sensor unit is designed as an acceleration sensor which continuously sends signals representing a vertical acceleration to the control unit which is configured to evaluate the signals of the at least one acceleration sensor in order to determine movement amplitudes of the working tool and to determine, as a function of the movement amplitudes, a maximum driving speed which ensures that the at least one working tool follows the rows during field driving. The at least one sensor unit can preferably be arranged at exposed points of the working tool. It is also conceivable to arrange, on the working tool, a sensing device which undergoes deflection as a result of uneven ground. The at least one sensor unit in turn is arranged on the sensing device. In this case, the sensing device can be designed as a feeler wheel arranged on a frame. The sensing device can be detachably arranged on the working tool by means of the frame.

It is advantageous that the at least one sensor unit can be retrofittable to the working tool. The sensor unit can subsequently be used and can communicate wirelessly, in particular via the Bluetooth Low Energy radio standard, with the control unit designed in the case of retrofitting as a portable data receiving device. Since cabling for signal and energy transmission to the sensor unit is not required, the retrofitting of a working tool can easily be realized. There is thus no need for retrofitting the working vehicle with an additional control unit. Instead, the portable data receiving device designed as a smartphone or tablet is used.

The data detected by sensors as well as the driving speed determined as a function of the movement amplitudes can be visualized on the portable data receiving device almost in real time. The operator can thus use such information in order to manually objectively adapt the respective driving speed to the soil condition/the movements on the attachment by means of the visualization of the measured values. For this purpose, a corresponding program code is stored on the mobile data receiving device, which is designed to evaluate the signals of the acceleration sensor and to determine the maximum driving speed.

The disclosure furthermore describes a control unit for a system comprising an agricultural working vehicle and at least one working tool arranged thereon.

In an advantageous development, the control unit can be configured to evaluate the operating data received from the sensor unit. For this purpose, software can be stored on the control unit, in order to evaluate the operating data. This makes it possible for the control unit to generate warnings which can be acoustically and/or optically notified to the operator. Such warnings can, for example, be fill-level messages or the due date for the maintenance of the working tool.

The communication taking place by means of the Bluetooth standard is not to take place in an unsecured manner. For this purpose, a key can be stored in the memory unit of the sensor unit and must be transmitted during communication setup by a control unit brought into the transmission range.

In particular, the control unit can be configured to transmit at least one selection parameter to a transmission control device of the working vehicle. For this purpose, after establishing a data transfer connection, the control unit can receive, from the sensor unit, specific operating data for the respective working tool, by means of which the working tool or the type of working tool can be identified. The identification of the working tool makes it possible to determine a selection parameter for controlling the transmission control device of the working vehicle, in order to operate the connected working tool with a presetting which is specific to the respective working tool and which can be stored in the transmission control device. A maximum permissible torque for the drive can thus be stored for the respective working tool in the transmission control device and can be selected on the basis of the identification by the control unit. The maximum pressure associated with the maximum permissible torque can thus be selected by the transmission control device from a stored pressure-torque characteristic curve, which is assigned to a specific working tool or working tool type and can be set by means of a proportional valve on a power take-off clutch, whereby only the maximum permissible torque can be transmitted by the power take-off clutch.

The invention is not limited to the specified combination of the features of the independent claims or the claims dependent thereon. Furthermore, there are possibilities for combining individual features, even insofar as they ensue from the claims, from the following description of preferred embodiments or directly from the drawings. The reference made by the claims to the drawings by the use of reference signs is not intended to limit the scope of the claims.

Figure 1:
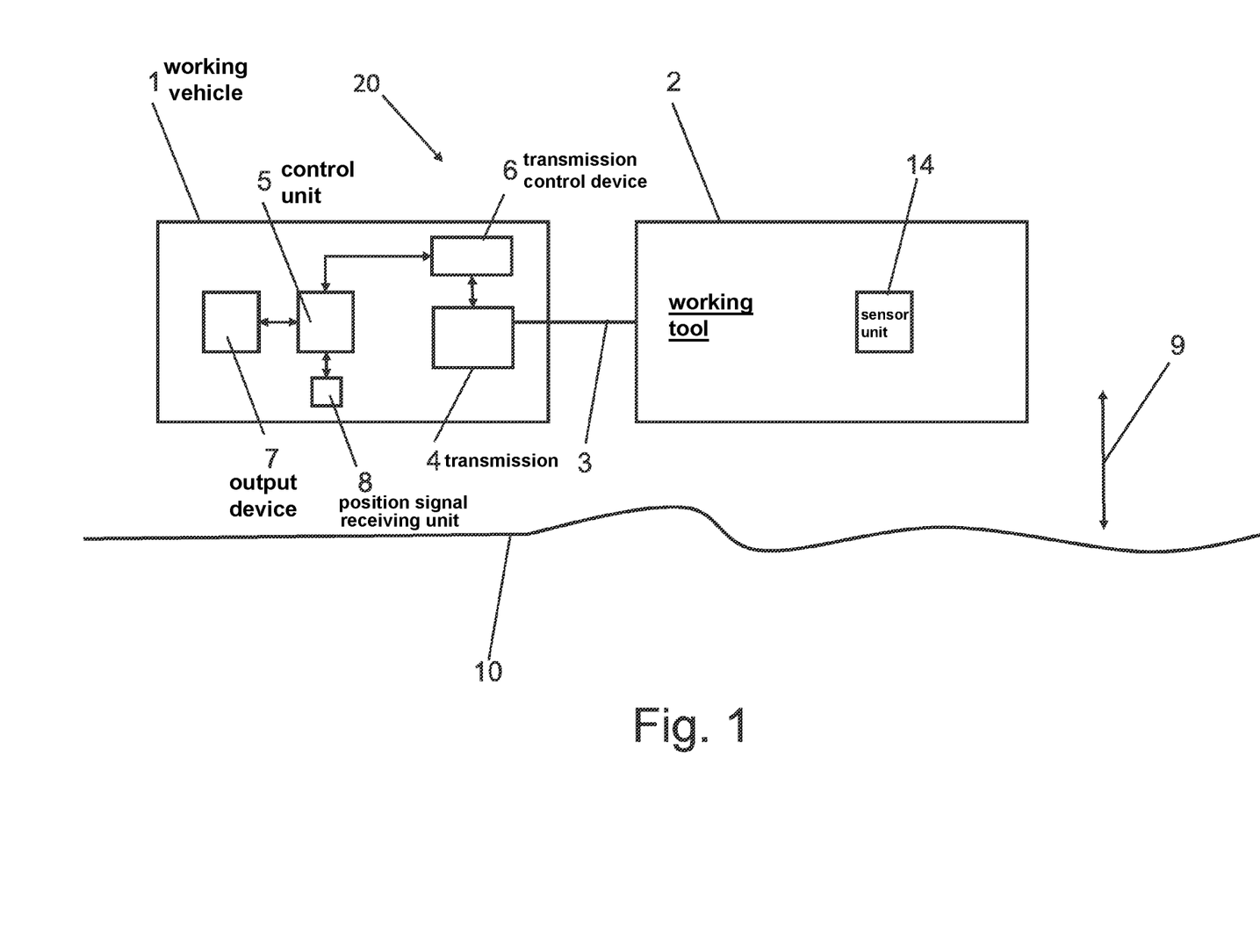
FIG. 1 a schematic view of a system comprising an agricultural working vehicle and a working tool.

FIG. 1 shows a schematic view of a system 20 comprising an agricultural working vehicle 1 and a working tool 2 operated to follow rows. The working vehicle 1 can be designed as a tractor, a system vehicle (also referred to as a trac vehicle), a device carrier or a self-propelled harvesting machine. The working tool 2 is designed as an attachment, which can be attached to the working vehicle 1 by corresponding receiving means, such as front or rear power lifts on the tractor or an intake duct of a self-propelled combine, and is carried by the same, or is pulled by the working tool 1, such as a liquid manure truck or the like. The working tool 2 is operated to follow rows; that is, it maintains lateral distances between adjacent rows to be worked along with plant distance numbers.

The working tool 2 is driven by a power take-off 3 of a transmission 4 of the working vehicle 1. For controlling the transmission 4 or the power take-off 3, the working vehicle 1 has a transmission control device 6. At least one sensor unit 14 is arranged on the working tool 2. Reference sign 9 denotes a vertical movement of the working tool 2, which the latter executes when driving over field soil 10 to be worked. The frequency and the movement amplitude of the vertical movements 9, which also include vibrations of the working tool 2, essentially depend on the surface condition of the traversed field soil 10 and on the respective driving speed of the working vehicle 1, with which the working tool 2 is moved across the field soil 10.

A control unit 5 assigned to the working vehicle 1 is connected using signal technology to an output device 7, which is used to provide operating parameters of at least the working vehicle 1. The control unit 5 is furthermore connected using signal technology to the transmission control device 6 of the working vehicle 1 and to the at least one sensor unit 14 of the working tool 2. Communication takes place in a wired manner, for example via CAN bus, or wirelessly through radio networks. A position signal receiving unit 8 is furthermore provided and is arranged on the working vehicle 1. The position signal receiving unit 8 is connected using signal technology to the control unit 5. The control unit 5 is arranged on the working vehicle 1. Alternatively, the control unit 5 can be designed as a mobile data receiving device, which is carried by an operator of the working tool 2. For example, a smartphone or a tablet PC is used as the mobile data receiving device. For this purpose, a corresponding program code is stored on the mobile data receiving device, which is designed to evaluate the signals of the acceleration sensor 21 and to determine the maximum driving speed.

Figure 2:
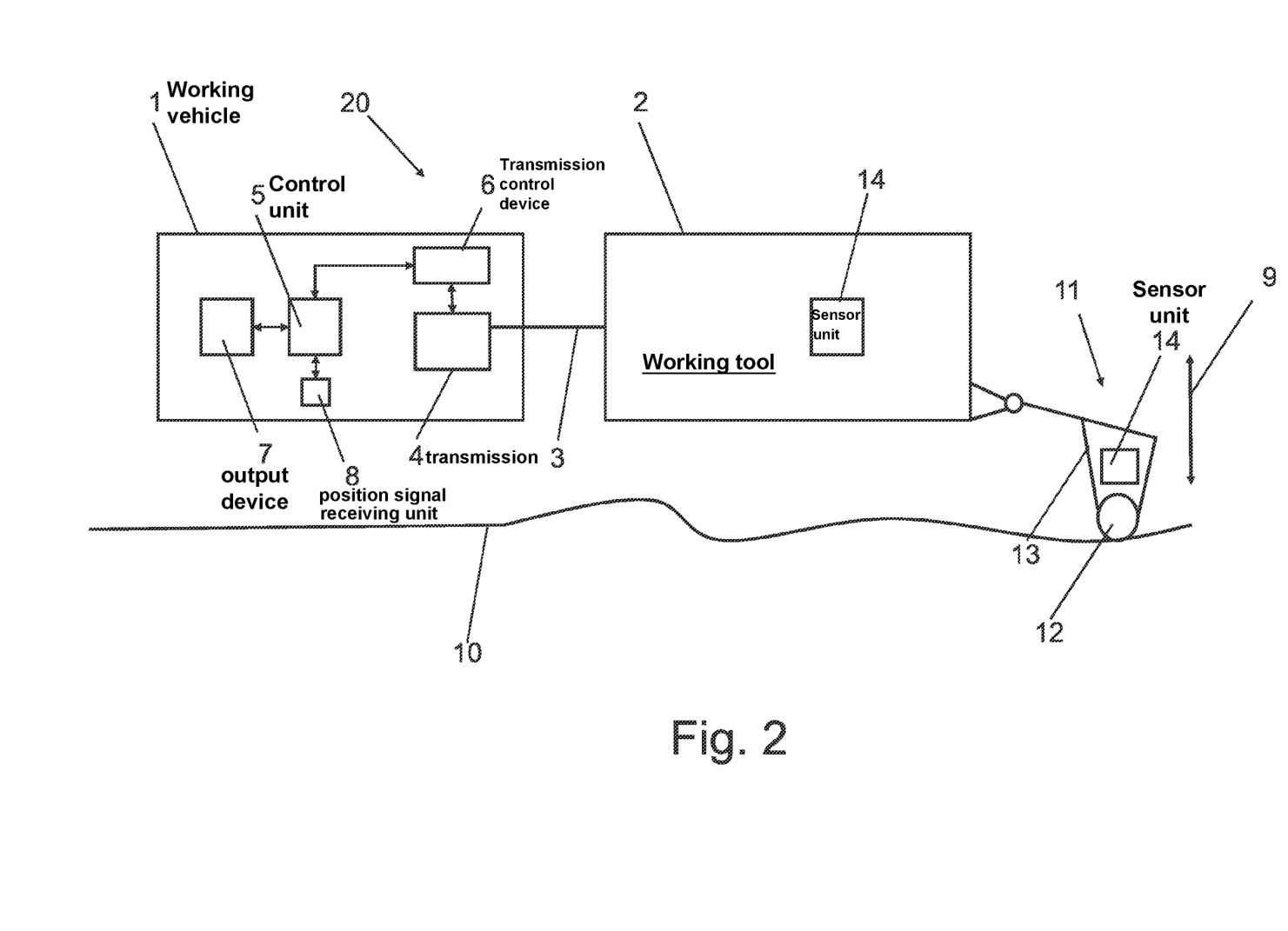
FIG. 2 a schematic view of the system comprising an agricultural working vehicle and a working tool with a sensing device arranged thereon.

FIG. 2 shows a schematic view of the system 20 comprising an agricultural working vehicle 1 and a working tool 2 operated to follow rows. A sensing device 11 is arranged on the working tool 2. The sensing device 11 comprises a feeler wheel 12, which is hinged to the working tool 2 by means of a frame 13. The feeler wheel 12 follows the ground contour of the field soil 10, as a result of which it experiences a vertical deflection. A further sensor unit 14 is arranged on the frame 13.

Figure 3:
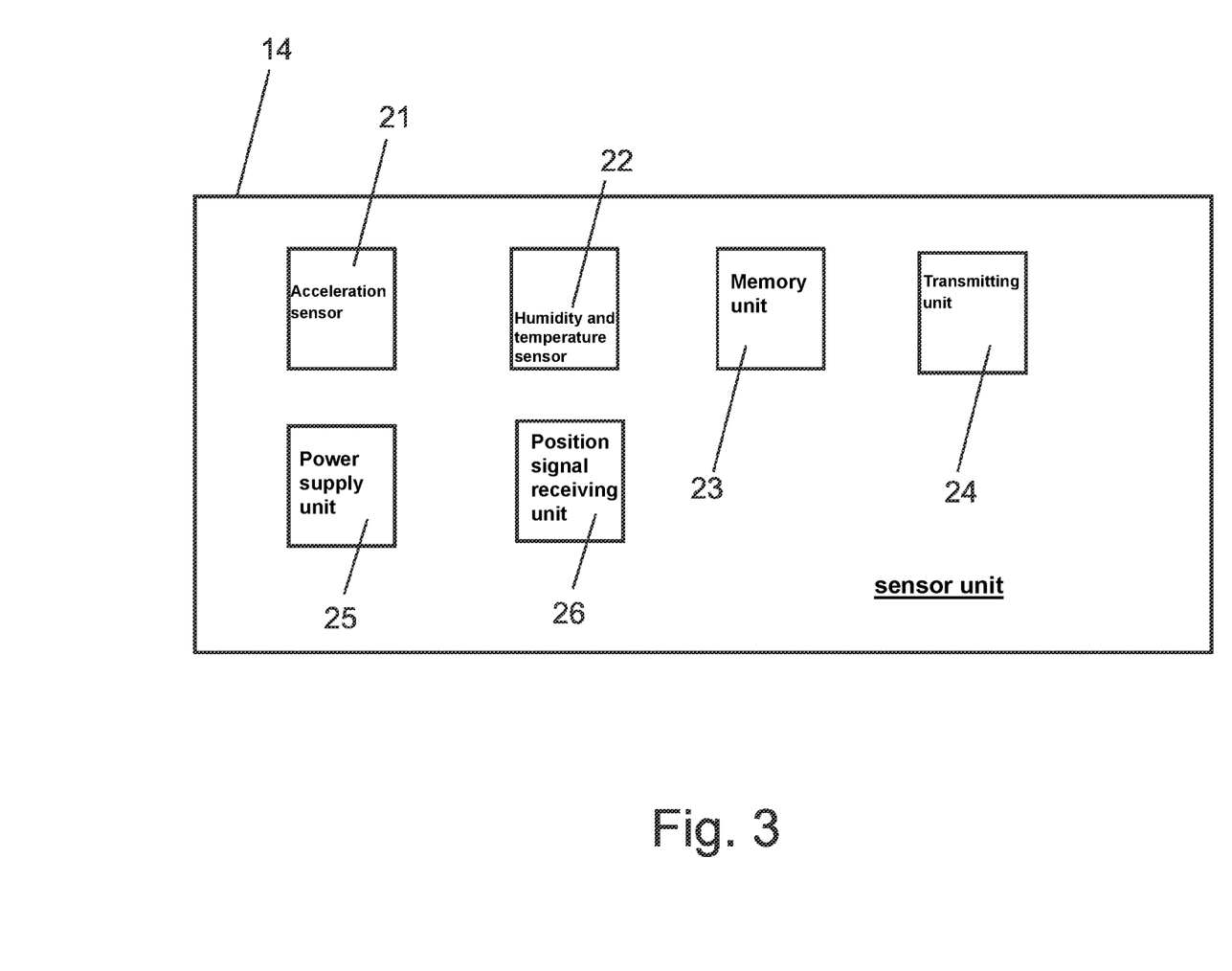
FIG. 3 a schematic illustration of the construction of a sensor unit for detecting and storing operating data of a working tool.

FIG. 3 shows a schematic illustration of the construction of the sensor unit 14 for detecting and storing operating data of the working tool 2. The sensor unit 14 comprises at least two sensors for detecting various physical variables. The sensor unit 14 has an acceleration sensor 21, at least one additional sensor 22, a memory unit 23, a transmitting unit 24 and an energy supply unit 25. A position signal receiving unit 26 is furthermore provided, from which continuously received position signals are transmitted to the memory unit 23, which stores them. In order to connect the control unit 5 to the sensor unit 14 using signal technology, the control unit 5 must be brought into the transmission range of the transmitting unit 24.

Signals which are detected by the acceleration sensor 21 and represent a vertical acceleration of the working tool 2 are stored by the memory unit 23. The vertical movements 9 of the working tool 2 or of the sensing device 11 are recognized by means of the acceleration sensor 21 and are continuously detected as operating data. The transmitting unit 24 operating according to the Bluetooth Low Energy (BLE) radio standard transmits the signals detected by the acceleration sensor 21 to the control unit 5, if the latter is within range of the transmitting unit 24.

The at least one additional sensor 22 can be designed as a combined humidity and temperature sensor. Signals detected by the combined temperature and humidity sensor 22 are also stored by the memory unit 23. In this case, the position data provided by the position signal receiving unit 26 can be combined with the received signals of the sensors 21, 22, for example by a time stamp. The sensor unit 14 thus enables the automatic detection of operating data, which can be determined from the detected signals of the various sensors 21, 22, 26. The autonomously operating sensor unit 14 can subsequently be attached to the working tool 39. The possibility of subsequently attaching the sensor unit 14 has the advantage that the sensor unit can also be used on older working tools, independently of the respective manufacturer of the working tool. No additional wiring is required, since the sensor unit 14 comprises all components necessary for communication and power supply.

For operating the system 20, it is provided that the signals which are continuously detected by the at least one acceleration sensor 21 and represent a vertical acceleration are sent to the control unit 5. The signals of the at least one acceleration sensor 21 for determining movement amplitudes and their frequency of the working tool 2 are evaluated by the control unit 5. On the basis of this evaluation, a maximum driving speed is determined as a function of the movement amplitudes and ensures that the at least one working tool 2 follows the rows and/or the plant row distance when driving over the field soil 10 to be worked. Following such distances, or the precision in working the field soil 10, is crucial for achieving a maximum yield or a best possible resource utilization.

The method is described by way of example on the basis of a working tool 2 designed as a single-grain sowing device. In order to achieve a best possible efficiency in working the field soil 10, a high driving speed is desired. For this purpose, a constant driving speed with which the working vehicle 1 and the working tool 2 arranged thereon move over the field soil 10 can be set by means of the control unit 5. Depending on the surface condition of the traversed field soil 10, jerk-like accelerations, vertical movements 9 and/or vibrations of different amplitude and frequency occur on the working tool 2 designed as a single-grain sowing device. The movements caused thereby of the devices for spreading seed lead to a serious loss of precision, which is reflected at a later point in time in a reduction in yield during harvesting. Since the movements of the working tool 2 essentially depend on the surface condition of the traversed field soil 10 or on the driving speed of the working vehicle 1, the information about the movement amplitudes of the working tool 2 is of great importance for the operator of the working vehicle 1, but above all for the control of the working vehicle 1 and of the transmission 4. The maximum driving speed, which is determined by the control unit 5 and which enables the precise operation of the working tool 2 while maintaining the boundary conditions, is used to automatically adjust the driving speed of the working vehicle 1. As a result, maximum efficiency can be achieved while maintaining the boundary conditions for the necessary precision when operating the working tool 2.

The maximum driving speed of the working vehicle 1 determined by the control unit 5 is visualized by the output device 7. The operator can thus manually adapt the respective driving speed to the determined maximum driving speed if the automatic adaptation of the driving speed of the working vehicle 1 by the control unit 5 is not possible.

Furthermore, the determined maximum driving speed of the working vehicle 1 can be displayed on the mobile data receiving device, designed as control unit 5, of the operator. The operator can use such information in order to manually objectively adapt the driving speed to the soil condition or to the movements of the working tool 2 based on the visualization of the measured values and the determined maximum driving speed. This can be the case especially in the case of older working vehicles, since such vehicles generally have no electronic cruise control.

Furthermore, position signals received from a positioning system are sent to the control unit 5 and assigned by the control unit 5 to the respective signals which are detected by the at least one acceleration sensor 21 and represent the vertical acceleration. The position signals received by the position signal receiving unit 26 as well as the signals detected by the acceleration sensor 21 are stored in the memory unit 23 of the sensor unit 14. Such operating data can thus also be retrieved at a later point in time if no control unit 5 which is configured to receive data of the sensor unit 14 has been within range in the meantime.

An additional application of the sensor unit 14 results from the recognition of various operating states of the working tool 2. The storage, the transport of the working tool 2 to or between fields to be worked, and the usage on a field to be worked are to be distinguished as operating states of the working tool 2. In the case of storage, the sensor unit 14 does not provide any data which can be used to infer a movement of the working tool 2. The position signal receiving unit 26 correspondingly does not log any change in position of the working tool 2. During transport of the working tool 2, the acceleration sensor 21 detects specific measured values, which are characteristic of a road transport. The same applies to the actual usage of the working tool 2 if it is used for working a field. The distinction by the control unit 5 between the operating states based on the data received from the sensor unit 14 makes it possible to detect the actual operating hours.

A further possible application is given in the case of a fluid-spreading working tool 2, if the latter has an additional sensor 22 for determining the fill level in the fluid container of the working tool 2. The determination of the current fill level by the control unit 5 is used to automatically control the transmission control device 6. When the fluid container is full, the working vehicle 1 is operated with other transmission settings of the transmission 4 than when the fluid container is half-empty or emptied. In addition, the decreasing fill level in the fluid container of the working tool 2 has an effect on the acceleration behavior when driving over uneven field soil 10.

The respective transmitting unit 24 is coded with a dedicated, unique address, so that a respective working tool 2 connected to the working vehicle 1 is identified by the control unit 5 once the control unit 5 is within range of the sensor unit 14. Specific parameters for various working tools 2 are stored in the control unit 5 or the transmission control device 6 and are retrieved after the identification of the connected working tool 2 and are set before starting the working tool 2. For example, a parameter for a maximum torque that can be transmitted to the working tool 2 can thus be assigned thereto.

Figure 4:
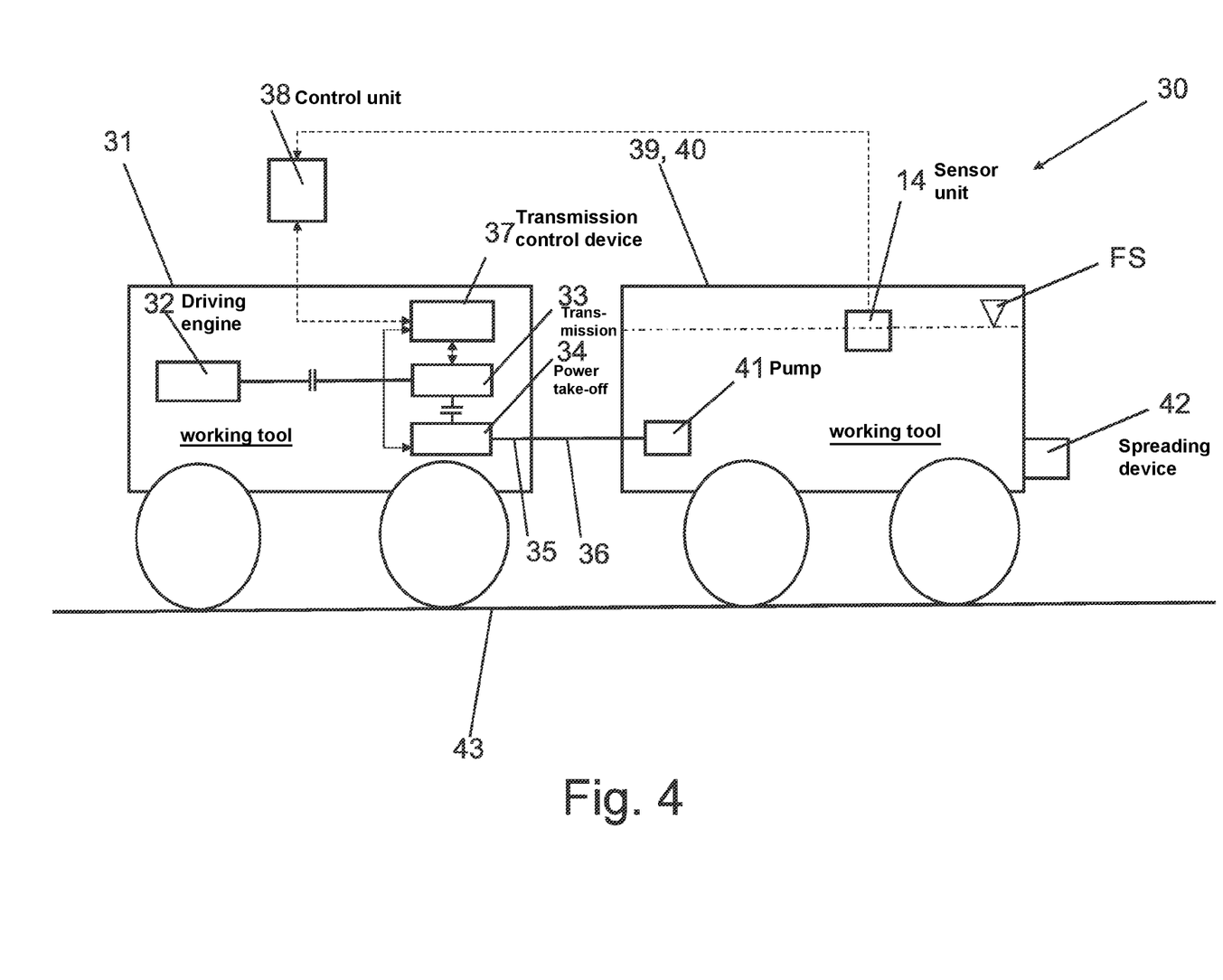
FIG. 4 a schematic view of a system comprising an agricultural working vehicle and a working tool according to a second embodiment.

FIG. 4 shows a schematic view of a system 30 comprising an agricultural working vehicle designed as a tractor 31 and a working tool 39 which is arranged thereon, is designed as a liquid manure truck 40, and is coupled to a towing device of the tractor 31. If the liquid manure truck 40 is designed as a precision manifold, it is operated in a row-dependent manner. The exemplary embodiment in FIG. 4 shows a further exemplary application for the sensor unit 14 for operating data detection, which sensor unit can be attached to a working tool.

The tractor 31 has a driving engine 32 which is designed as an internal combustion engine. The driving engine 32 is connectable to a transmission 33 by means of a clutch. The working tool 39 is driven by a power take-off 34, which can be connected in terms of the drive to the transmission 33 of the tractor 31 by a power take-off clutch. On the output side, the power take-off 34 has a power take-off shaft 35 to which a propeller shaft 36 can be connected, in order to transmit a torque to the working tool 39 for driving a power unit of the working tool 39. In the case of the working tool 39 designed as a liquid manure truck 40, the power unit is a pump 41, which is used for filling and emptying the liquid manure truck 40. Reference sign 42 denotes a spreading device which is arranged on the liquid manure truck 40 and by means of which the liquid manure is spread on a field 43. For controlling the transmission 33 or the power take-off 34, the working vehicle 31 has a transmission control device 37. The at least one sensor unit 14 is arranged on the working tool 39 and is configured to determine by sensors and to store operating data of the working tool 39, as it is used in the system 20 described above.

A control unit 38, which is in particular mobile and which is assigned to the working vehicle 31, can be automatically connected using signal technology to the at least one sensor unit 14 of the working tool 39, if the control unit 38 is brought into the transmission range of the sensor unit 14. This can be done, on the one hand, by bringing the control unit 38 together with the working vehicle 31 to the working tool 39 or by an operator who carries the control unit 38 entering the transmission range of the sensor unit 14. Communication between the control unit 38 and the at least one sensor unit 14 takes place wirelessly through a radio connection according to the Bluetooth radio standard.

The transmitting unit 24 operating according to the Bluetooth Low Energy (BLE) radio standard automatically transmits the signals detected by the sensors 21, 22, 26 and stored in the memory unit 23 to the control unit 38 if the latter is within range of the transmitting unit 24. If there is no control unit 38 in the transmission range of the transmitting unit 24, the data is stored at least for the duration until later retrieval by the control unit 38. The autonomously operating sensor unit 14 can subsequently be attached to the working tool 39.

In addition to detecting and storing operating data of the working tool 39, the sensor unit 14 also has the function of being able to uniquely identify the working tool 39. For this purpose, an individual identifier for the working tool 39 on which the sensor unit 14 is arranged can be stored in the memory unit 23. The individual identifier can be programmed, in particular by means of the control unit 38.

The respective location of the working tool 39 can be continuously detected by the position signal receiving unit 26 irrespective of such working tool's operating state and the existence of a data connection to the control unit 38. That is to say, on the basis of a movement profile that can be generated from the continuously detected and stored position data, it is possible to determine whether the working tool 39 is currently in use on a field, is located on a working vehicle 31 or on a transport vehicle in order to move the working tool 39 between various parcels of arable land to be worked, or is located on a farm facility for maintenance or repair purposes, for example.

The position data detected by the position signal receiving unit 26 can be linked by the data detected by the acceleration sensor 21, in order to enable independent operation hour detection of the working tool 39. The use of the working tool 39 in conjunction with changing working vehicles 31 or the use of various working tools 39 on a single working vehicle 31 results in the operating hours detected by the operating hour counter of the working vehicle 31 not corresponding to the actually performed operating hours of the working tool 39. Determining the operating hours of the working tool 39 by sensors independently of the working vehicle 31 makes it possible to determine the respective actual operating duration more accurately in the case of borrowed or leased working tools. In addition, maintenance intervals of the working tool 39 can be observed more accurately in this way.

By means of the humidity sensor 22, the sensor unit 14 monitors and stores the exceeding or falling below of a fill level FS of the fluid-spreading working tool 39, i.e., of the liquid manure truck 40. The positioning of the sensor unit 14 may correspond to a fill level of 85%, for example. If the liquid manure truck 40 is filled again after it was detected that this fill level was not reached, and if the filling quantity exceeds the fill level FS, this is evaluated as a new filling and correspondingly stored in the memory unit 23 with a time stamp. An arrangement of at least one further sensor unit 14 in the interior of the liquid manure truck 40 enables a more differentiated determination of different fill levels FS.

The sensor unit 14 can also be used in a loading wagon, to which harvested crop is transferred by a self-propelled harvesting machine, such as a combine or a forage harvester. On the one hand, the passage of a fill level height definable by the position of the sensor unit can be detected and transmitted to the control unit 38, in order to output a warning that the maximum filling height is soon reached. On the other hand, the humidity sensor 22 makes it possible to determine the moisture content of the transferred crop, in order to be able to decide whether the crop must be subjected to drying on account of the moisture content before storage.

A further possible application is given in the case of the liquid manure truck 40 designed as a fluid-spreading working tool 39 if the fill level in the liquid manure truck 40 determined by the at least one sensor unit 14 is used to automatically control the transmission control device 37. Depending on the fill level in the liquid manure truck 40, different transmission settings are necessary, since a working vehicle 31 with a pulled full liquid manure truck 40 requires different transmission settings than a trailer. In this way, the vehicle driver can be relieved of a recurrent manual adaptation of the transmission settings as a function of the total weight of the system 30.

At least one operating parameter specific to the working tool 39 is furthermore stored in the memory unit 23 and can be used by the transmission control device 37 of the working vehicle 31 to operate the working tool 39. Using data technology, the control unit 38 communicates, preferably wirelessly, with the transmission control device 37 and transmits to the transmission control device 37 as operating parameters the individual identifier of the working tool 39 or information about the kind and type of the working tool 39. In the transmission control device 37, a configuration corresponding to the transmitted operating parameter can be stored for the working tool 39 and is used to control the power take-off 34. In this way, a torque which can be transmitted by the hydraulically actuated power take-off clutch can be specified and is provided as a maximum for properly driving the specific working tool 39 without damage during continuous operation.

The above-described exemplary embodiments are based on the common idea of providing a method for operating the systems 20, 30, which enables the detection of operating data of a working tool 2, 39, irrespective of whether a control unit 5, 28 configured for reception and evaluation is connected using signal technology to the at least one sensor unit 14. The sensor unit 14 with its at least two sensors 21, 22, 26 detects the operating data of the working tool 2, 39 and stores it in its memory unit 23. The operating data is thus also available for evaluation at a later point in time.

The operating data detected by the control unit 5 or 38 can be transmitted to a central planning and management system, which is operated on a central computer of a farm facility.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Working vehicle
2 Working tool
3 Power take-off
4 Transmission
5 Control unit
6 Transmission control device
7 Output device
8 Position signal receiving unit
9 Vertical movement
10 Field soil
11 Sensing device
12 Feeler wheel
13 Frame
14 Sensor unit
20 System
21 Acceleration sensor
22 Humidity and temperature sensor
23 Memory unit
24 Transmitting unit
25 Power supply unit
26 Position signal receiving unit
30 System
31 Working vehicle
32 Driving engine
33 Transmission
34 Power take-off
35 Power take-off shaft
36 Propeller shaft
37 Transmission control device
38 Control unit
39 Working tool
40 Liquid manure truck
41 Pump
42 Spreading device
43 Field soil
20 System
FS Fill level

The invention claimed is:

1. A method for operating a system consisting of an agricultural working vehicle, at least one working tool arranged thereon, and a controller assigned to the working vehicle, the method comprising:
  detecting, by at least one sensor assembly arranged at least on the working tool and having at least two sensors, the at least two sensors configured to detect two different physical variables, wherein:
    the sensor assembly comprises an acceleration sensor, via which an operating state of the working tool is determined, and
    signals representing a vertical acceleration are transmitted continuously from the at least one acceleration sensor to the controller, via which the signals of the at least one acceleration sensor are evaluated in order to determine movement amplitudes of the working tool, wherein a maximum driving speed, which ensures that the at least one working tool follows rows during field driving, is determined as a function of the movement amplitudes;
  storing, by a memory, information characterizing the working tool;
  continuously storing, by the memory, operating data of at least the working tool; and
  communicating wirelessly via a Bluetooth network with the controller by the at least one sensor assembly via a transmitter, wherein the controller is brought into a transmission range of the sensor assembly to activate the communication between them and the operating data temporarily stored in the memory is transmitted to the controller.

2. The method according to claim 1, wherein the sensor assembly has an individual identifier, via which the sensor assembly is identified by the controller.

3. The method according to claim 1, wherein at least temperature and humidity are determined by the sensor assembly as physical variables.

4. The method according to claim 1, wherein the sensor assembly comprises a position signal receiver, via which a respective location of the working tool is continuously detected independently of its operating state.

5. The method according to claim 1, wherein the driving speed of the working vehicle is automatically adapted to the determined maximum driving speed by the controller.

6. The method according to claim 1, wherein the determined maximum driving speed of the working vehicle is displayed by the controller on an output device.

7. The method according to claim 1, wherein position signals received from a positioning system are sent to the controller and are assigned by the controller to the respective signals which are detected by the at least one acceleration sensor and represent the vertical acceleration.

8. The method according to claim 7, wherein the movement amplitudes and their frequency are mapped by the controller by the detected position signals.

9. The method according to claim 1, wherein the signals of the at least one acceleration sensor are evaluated by the controller for operating state recognition.

10. The method according to claim 1, wherein at least one operating parameter specific to the working tool is stored in the memory and is used by a control device of the working vehicle to operate the working tool.

11. The method according to claim 10, wherein the at least one specific operating parameter is transmitted from the controller or the at least one sensor assembly to the control device of the working vehicle.

12. The method according to claim 1, wherein fill-level data of a fluid-spreading working tool provided by a fill-level sensor system is received and stored by the sensor assembly.

13. The method according to claim 12, wherein the controller uses the fill-level data received from the sensor assembly to control a transmission control device of the working vehicle.

14. The method according to claim 1, wherein fill-level data of a fluid-spreading working tool is determined and stored by the sensor assembly based on the signals representing a vertical acceleration transmitted continuously from the at least one acceleration sensor.

15. A system comprising:
- an agricultural working vehicle having at least one working tool arranged thereon, wherein the working tool is configured to be operated to follow rows during field driving;
- a controller assigned to the working vehicle;
- at least one sensor assembly arranged on the working tool and having at least two sensors configured to detect two different physical variables, wherein at least one of the at least two sensors is an acceleration sensor that continuously sends signals representing a vertical acceleration to the controller, wherein the controller is configured to evaluate the signals of the at least one acceleration sensor to determine movement amplitudes of the working tool and to determine, as a function of the movement amplitudes, a maximum driving speed, which ensures that the at least one working tool follows the rows during the field driving;
- a memory configured to store operating data of the working tool; and
- a transmitter configured to wirelessly communicate with the controller,
- wherein the controller is configured to be brought into a transmission range of the sensor assembly to activate the communication between them, in order to transmit operating data temporarily stored in the memory to the controller.

16. The system according to claim 15, wherein the sensor assembly is configured to be retrofitted to the working tool.

* * * * *